United States Patent [19]

Okino

[11] Patent Number: 4,748,462
[45] Date of Patent: May 31, 1988

[54] STARTING ARRANGEMENT FOR FLASH DEVICE

[75] Inventor: Tadashi Okino, Kanagawa, Japan

[73] Assignee: Canon Kabushiki Kaisha, Tokyo, Japan

[21] Appl. No.: 807,289

[22] Filed: Dec. 10, 1985

[30] Foreign Application Priority Data

Dec. 13, 1984 [JP] Japan .................................. 59-263660
Dec. 18, 1984 [JP] Japan .................................. 59-266778

[51] Int. Cl.$^4$ ............................................ G03B 15/05
[52] U.S. Cl. .................................. 354/145.1; 354/417; 354/141
[58] Field of Search ............... 354/413, 416, 417, 126, 354/129, 141, 145.1

[56] References Cited

U.S. PATENT DOCUMENTS

| | | | |
|---|---|---|---|
| 3,858,227 | 12/1974 | Ellin et al. | 354/141 |
| 4,095,245 | 6/1978 | Kuraishi | 354/141 |
| 4,174,896 | 11/1979 | Mizokami et al. | 354/145.1 |
| 4,222,647 | 9/1980 | Kawarada et al. | 354/145.1 |

Primary Examiner—Russell E. Adams
Attorney, Agent, or Firm—Toren, McGeady & Associates

[57] ABSTRACT

A starting arrangement for a flash device is arranged to be capable of responding to either a flash device of the type having a high voltage trigger circuit and a flash device of another type having a low voltage trigger circuit. The starting arrangement has a starting circuit for triggering a high voltage and another starting circuit for triggering a low voltage. The two starting circuits are connected in parallel with each other.

20 Claims, 8 Drawing Sheets

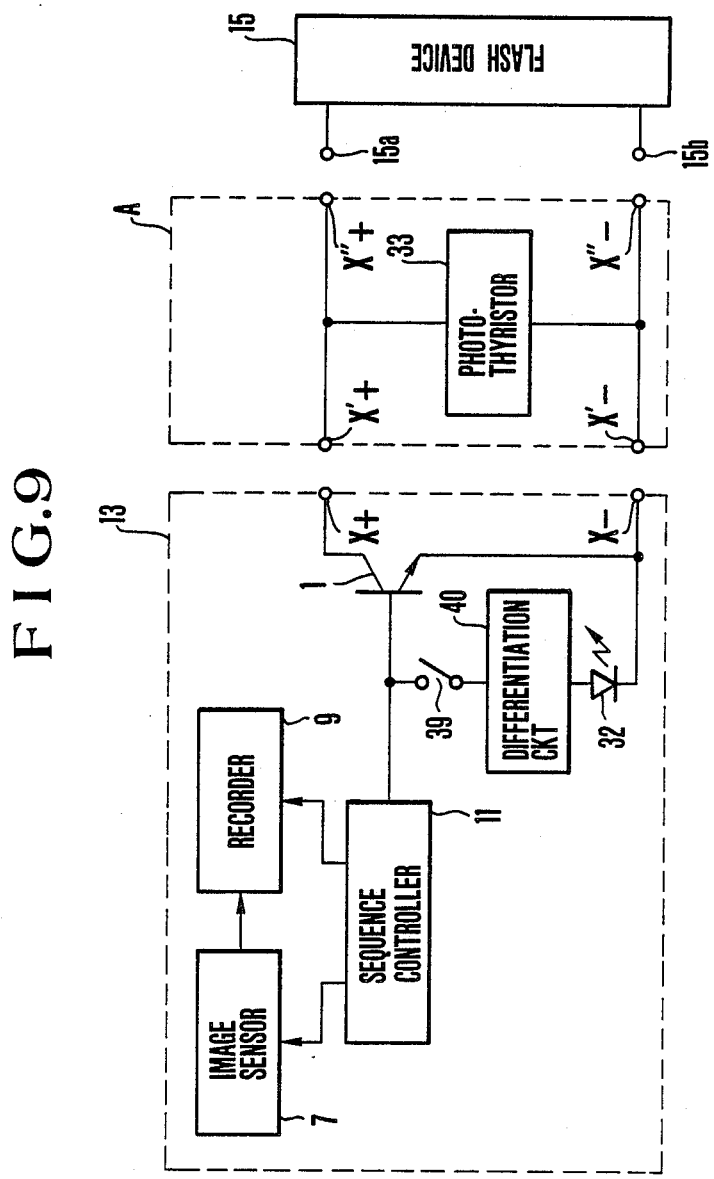
F I G. 9

STARTING ARRANGEMENT FOR FLASH DEVICE

BACKGROUND OF THE INVENTION:

This invention relates to a starting arrangement for a flash device and more particularly to a starting arrangement for a flash unit operated by an electronic circuit.

DESCRIPTION OF THE PRIOR ART

A conventional trigger circuit for starting a flash unit is connected to the flash unit by a contact within an image sensing device. The contact is closed at the time suitable for a flash. Trigger circuits for such starters can be roughly classified into two types, according to the kind of flash device used. A high voltage trigger circuit applies a large current to the contact, conversely, a low voltage trigger circuit applies a small current to the contact. At present, the latter is more popular than the former. However, one would prefer a flash device with a starting arrangement capable of performing the functions of both types of trigger circuits.

Generally, a conventional image sensing device uses the aforementioned starting arrangement in the form of a mechanical contact which shifts from OFF to ON in response to a shutter opening operation to begin the actuation of the flash unit. Such a conventional starting arrangement offers the following advantages: (a) The arrangement readily permits a high voltage and a large current flow; and (b) The ON and OFF timing of the contact is linked to the shutter operation, and therefore the mechanically strong shutter-driving force is available for the contact.

However, this conventional starting arrangement has the following shortcomings among others: (a) Contact resistance must be low in order to allow a large current flow for a flash. This necessitates high contact pressure and materials of low contact resistance, which is expensive; (b) Use of such an expensive material does not assure adequate reliability of the contact because of surface oxidation of the contact results in high contact resistance and sticking; (c) Inadequate flashes may occur due to chattering, etc.; and (d) An additional contact drive mechanism must be provided if an image sensing device using a mechanical shutter or the like does not have a strong shutter mechanism. This makes the device complex, larger in size and expensive.

Meanwhile, attempts to perform the contact function with an electronic arrangement produces other disadvantages. Since the contact is to perform the functions of both high and low voltage triggering circuits, it is conceivable to use a transistor or a thyristor as a switching element. However, the use of either of these elements presents additional problems.

A flash unit can be flashed with a low voltage trigger circuit using a transistor. However, a flash device for a high voltage trigger circuit cannot employ a transistor because of its excessively high ON resistance. In using a thyristor, the ON resistance is sufficiently low to avoid this problem. However, the thyristor is incapable of being turned OFF once it is on when a constant current larger than a predetermined value (a holding current) is allowed to flow therethrough. Therefore, although the thyristor enables the flash device to flash once, it does not enable the flash device to repeat several flashes after the first flash. An example of a flash driving arrangement using a thyristor is disclosed in Japanese Utility Model Publication No. SHO 57-28171.

A flash unit which solves the problem presented by the use of a thyristor is disclosed, for example, in Japanese Patent Publication No. SHO 58-45793. The device disclosed brings the thyristor back to an OFF state after it has been turned on. In accordance with the disclosed arrangement, however, the mechanism for returning the thyristor to its OFF state is provided in the flash device. Where a flash device is incapable of performing this function, the image sensing device still has the same problem of having the thyristor stay ON.

SUMMARY OF THE INVENTION

It is an object of this invention to provide a flashing action starting arrangement which solves the problems of the conventional flash device and is capable of responding to flash devices of both the high voltage trigger type and the low voltage trigger type.

A more specific object of this invention is to provide a flashing action starting arrangement which is capable of responding to flash devices of both the high voltage trigger type and the low voltage trigger type and is capable of enabling a flash device to perform without fail an ensuing flashing action after completion of one performance of flashing.

The above and further objects and features of this invention will become apparent from the following detailed description of preferred embodiments thereof taken in connection with the accompanying drawings.

BRIEF DESCRIPTION OF THE DRAWINGS

FIG. 9 is a circuit diagram showing the arrangement of another system employing a photo-thyristor.

DETAILED DESCRIPTION OF THE PREFERRED EMBODIMENTS

Figure 1:
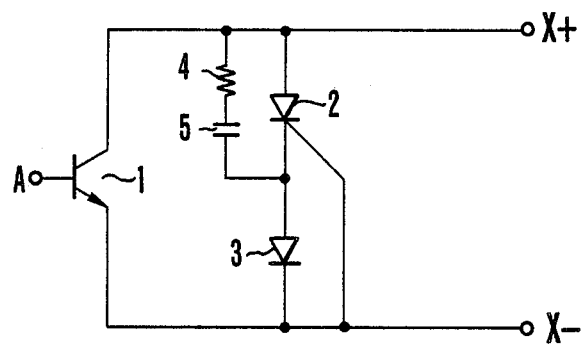
FIG. 1 is a circuit diagram showing a first embodiment of this invention.

The following description shows the details of this invention with reference to the accompanying drawings FIG. 1 is a circuit diagram showing as a first embodiment of this invention a flashing action starting arrangement. The illustration includes a transistor 1, the base of which is connected to a control output terminal A of an image sensing device. The transistor 1 is arranged to receive from the image sensing device a positive pulse at a suitable time in synchronism with shutter release.

The collector and emitter of the transistor 1 are connected respectively to the positive and negative trigger terminals X+ and X− of a flash device. Between the terminals X+ and X− is connected a series circuit consisting of a thyristor 2 and a diode 3. The anode of the thyristor 2 is connected to the terminal X+ and the cathode of the diode 3 to the terminal X−. The cathode of the thyristor 2 and the anode of the diode 3 are interconnected. The gate of the thyristor 2 is connected to the terminal X−. A series circuit composed of a resistor 4 and a capacitor 5 is connected in parallel with the anode and cathode of the thyristor 2. The embodiment which is arranged in this manner operates as described below:

With a flash device which is not shown connected to the image sensing device, when a power supply is switched on, a high voltage or a low voltage is generated between the terminals X+ and X− according to whether the flash device is of the high voltage trigger type or the low voltage trigger type. The capacitor 5 is then charged via the resistor 4 and the diode 3 with the voltage between the terminals X+ and X−.

If the flash device is of the low voltage trigger type, a positive pulse is applied from the image sensing device via the terminal A to the base of the transistor 1. The transistor 1 then turns on. The part between the terminals X+ and X− is shortcircuited to cause the flash device to flash. In this instance, only a small current is allowed to flow between the terminals X+ and X−. Therefore, the use of the transistor 1 alone suffices for a low voltage trigger type flash device.

When the flash device is of the high voltage trigger type, the use of the transistor 1 alone is insufficient to obtain a necessary current flow for causing the flash device to flash. In this case, therefore, the voltage between the terminals X+ and X− drop. Accordingly, an electric charge accumulated at the capacitor 5 is discharged through a passage which is: resistor 4→transistor 1→the gate of the thyristor 2→ the cathode of the thyristor 2. A current flows to the gate of the thyristor 2 to cause it to turn on. With the thyristor thus turned on, a current large enough for causing the flash device to flash flows through the thyristor 2 and the diode 3. This causes the flash device to flash. Then, a current which flows from the terminal X+ to the terminal X− after completion of the flashing action is only a relatively small current even if it may somewhat exceed the holding current for the thyristor 2. Therefore, with the transistor 1 continuously left in its ON state, the voltage between the terminaqls X+ and X− drops to a value close to a saturation current between the collector and emitter of the transistor 1. Therefore, the current for the thyristor 2 can be made lower than the holding current thereof, so that the thyristor 2 can be turned off without fail. This enables the next flashing performance to be carried out without difficulty.

It is a feature of this embodiment that, where a flash device of the high voltage trigger type is employed, the transistor 1 is arranged not only to turn on the thyristor 2 but also to be kept on even after flashing by the flash device for the purpose of reducing current flowing between the anode and cathode of the thyristor 2 to a level lower than the self-holding current thereof. The arrangement is thus capable of turning the thyristor 2 on and off by means of one and the same semiconductor element. This greatly contributes to simplification of the structural arrangement of the image sensing device. This advantage becomes especially salient where the invented flashing action starting arrangement is arranged in the form of an adapter for a flash device.

Figure 2:
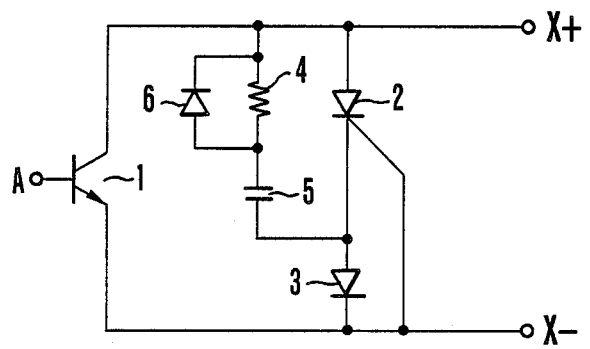
FIG. 2 shows a second embodiment which is an improvement over the first embodiment.

FIG. 2 shows another embodiment which is an improvement on the first embodiment shown in FIG. 1. The second embodiment is arranged in the same manner as the first embodiment with the exception that a diode 6 is connected in parallel with the resistor 4. Before description of the operation of the second embodiment with reference to FIG. 2, mention should be made of a shortcoming of the first embodiment shown in FIG. 1. of the arrangement shown in FIG. 1, when the electric charge of the capacitor 5 is discharged for the purpose of turning the thyristor 2 on, the timing for turning on the thyristor 2 would be delayed if a current loss due to the resistor 4 is excessively large. The voltage between the terminals X+ and X− drops as the degree of this timing delay increases. In that event, the electric energy stored at the trigger capacitor of the flash device also decreases. Thus, the electric energy might eventually become insufficient for flashing. Meanwhile, if the resistance value of the resistor 4 is arranged to be excessively low, the capacitor 5 would be charged to an excessive degree when a flash device is connected to the image sensing device. In that event, the flash device might accidentally be caused to flash. The second embodiment shown in FIG. 2 is arranged to eliminate this undesirable probability.

In the case of the circuit arrangement of FIG. 2, the capacitor 5 is arranged to be charged through the resistor 4. With the resistor 4 arranged to be of a sufficient resistance value, a flash device will never be accidentally caused to flash even if it is connected to the image sensing device in a charged state. The electric discharge of the capacitor 5 which results in a gate current of the thyristor 2 is arranged to be effected via the diode 6. The forward resistance of the diode 6 is low. Therefore, any loss due to the diode 6 never delays the timing for turning the thyristor 2 on.

Further, as previously mentioned, flash devices of the low voltage trigger type are more popularly employed than the high voltage trigger type. The use of the transistor 1 alone suffices for the flash device of this type. Meanwhile, the circuit elements other than the transistor 1 are arranged to operate independently of the image sensing device. The flashing action starting arrangement, therefore, may be taken out of the image sensing device and prepared in the form of an adaptor to be used only in the event of use of a flash device of the high voltage trigger type. With the flashing action starting arrangement arranged in that manner, the image sensing device can be reduced in size. An example of such arrangement is shown in FIG. 3, wherein an image sensing system is shown with the same elements as those shown in FIG. 2 or 1 indicated by the same reference numerals.

Figure 3:
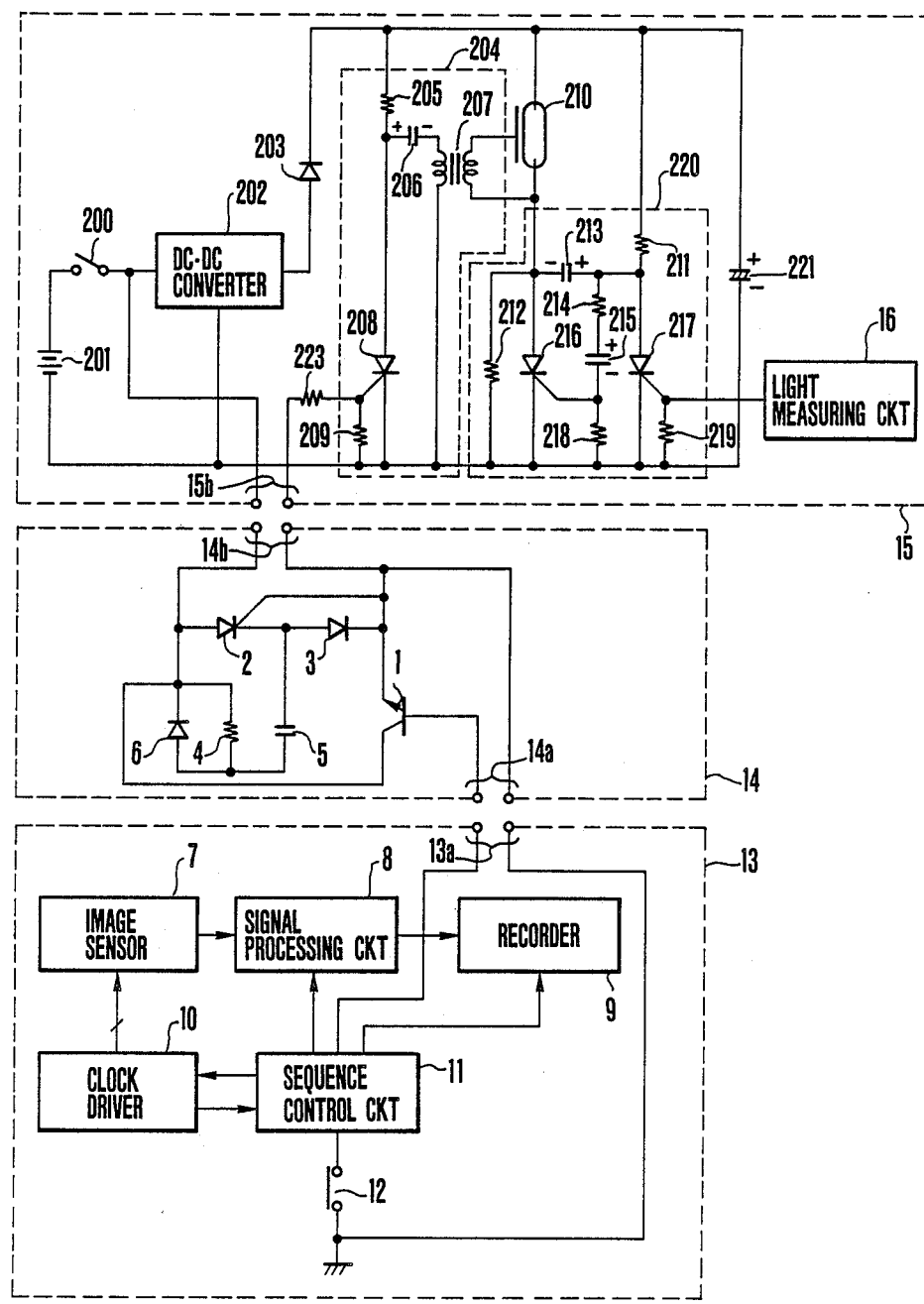
FIG. 3 is a circuit diagram showing a system employing a flashing action starting arrangement according to this invention.

Referring to FIG. 3, an adaptor 14 includes circuit elements 1 to 6 and input and output terminals 14a and 14b. An image sensing device 13 includes an image sensor 7 which is employed as image pickup means and is selected from such elements as a CCD (charge-coupled device), an image sensor of the XY address type, a camera tube, etc. A signal processing circuit 8 is arranged to perform various correcting operations on the output of the image sensor 7. A recorder 9 is arranged to record the output of the signal processing circuit 8. A clock drive 10 is arranged to produce a periodic drive signal for driving the image sensor 7.

A sequence control circuit 11 is arranged to perform a sequence control operation on the whole image sensing device 13. A release switch 12 is arranged in such a manner that, with this switch turned on, the recorder 9 records a one-shot portion of image obtained by using a flash device 15. An output terminal 13a is arranged to produce a flash device synchronizing trigger signal obtained from the sequence control circuit 11.

The flash device 15 includes a battery 201. The battery 201 is connected to the low voltage input side of a DC-to-DC converter 202. The output terminal on the high voltage side of the DC-to-DC converter 202 is connected via a rectifying diode 203 to various circuit elements including: A known trigger circuit 204 composed of a resistor 205, a trigger capacitor 206, a trigger transformer 207, a trigger thyristor 208 and a resistor 209; a known light quantity control circuit 220 composed of resistors 211, 212, 214, 218 and 219, a commutation capacitor 213, a capacitor 215, a main thyristor 216 and an auxiliary thyristor 217; and a main capacitor 221. These circuit elements are arranged in a parallel circuit. A flash tube 210 has its anode and cathode connected between the rectifying diode 203 and the main thyristor 216. The trigger electrode of the flash tube 210 is connected to the high voltage terminal of the trigger transformer 207. A series circuit composed of a terminal 15b which is arranged to be closed by a synchronizing signal and a resistor 223 is connected between the anode of the battery 201 and the gate of the trigger thyristor 208. The gate of the commutation thyristor 217 is connected to the output terminal of a light measuring circuit 16. Further, an input terminal 15b is arranged to receive a synchronized trigger signal for the flash device 15.

Figures 4A, 4B, 4C, 4D, 4E:
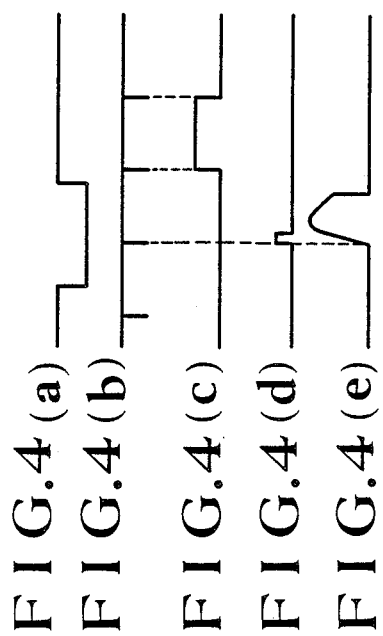
FIGS. 4(a) to 4(e) show in a timing chart the operation of the system.

The system of FIG. 3 is arranged as described above. With the terminals 13a and the terminals 14a interconnected and with the terminals 14b and 15b also interconnected, the system operates as follows: When a power supply switch 200 for the flash device 15 is turned on, the DC-to-DC converter 202 operates to charge the trigger capacitor 206, the commutation capacitor 213, the capacitor 215 and the main capacitor 221 up to about equal voltages in the polarity indicated (+, −) in the drawing. With the charge voltage having reached a sufficient level for flashing, when the image sensing device 13 is directed to a given object to be photographed and the release switch 12 is turned on under that condition, a pulse signal as shown in FIG. 4(a) comes to the sequence control circuit 11.

Meanwhile, the image sensing device 13 has received a power supply. Therefore, the clock driver 10 is producing a vertical synchronizing signal of a standard television signal, as shown in FIG. 4(b). In synchronism with the first pulse of the vertical synchronizing signal produced after arrival of the above-stated release signal, for example, the sequence control circuit 11 produces a synchronized trigger signal, as shown in FIG. 4(d). This signal is supplied via the terminals 13a and 14a to the transistor 1. Then, as previously mentioned, the parts between terminal elements 14b and between terminal elements 15b are respectively shortcircuited.

This causes a gate current to be supplied via the resistor 223 from the battery 201 to the trigger thyristor 208. The thyristor 208 then turns on the actuate the known trigger circuit 204. The falsh tube 210 is ionized and becomes conductive. The anode of the main thyristor 216 comes to have a high voltage to allow a gate current to flow to the main thyristor 216 via the communication capacitor 213, the resistor 214 and the capacitor 215. The main thyristor 216 turns on and a flashing action begins, as shown in FIG. 4(e).

The light adjusting operation of the system will now be described First, a reflection light coming from the object as a result of the flashing action is detected and intergrated at the light measuring circuit 16. When an integrated signal which is thus obtained comes to exceed a predetermined level, the light measuring circuit 16 produces a high level signal. This casues a gate current to flow to the auxiliary thyristor 21 to turn it on. With the auxiliary thyristor 217 turned on, a known light quantity control circuit 220 operates to instantaneously bring the flashing action to a stop, as shown in FIG. 4(e).

The flashing action starting arrangement according to this invention includes two kinds. One is arranged in the form of an adaptor which is attachable and detachable to and from an image sensing device as described. The other kind is arranged to be incorporated in an image sensing device. It goes without saying that, even in the case of the adaptor, some part of the circuit arrangement 14 may be included either in the image sensing device 13 or in the flash device 15.

Further, as well known, the flash device is generally arranged to flash with the X contact of synchronizing contact X shortcircuited, as shown in FIG. 3. In the case of the image sensing device 13 which is shown in FIG. 3, the flash device 15 can be caused to flash by just producing and applying a high level signal to one of the terminal elements 13a. Therefore, if a flash device 15 of the low voltage trigger type is connected directly to the image sensing device 13 of FIG. 3 without having the adapter 14 interposed in between them, the flash device of the low voltage trigger type cannot be caused to flash.

Figure 5:
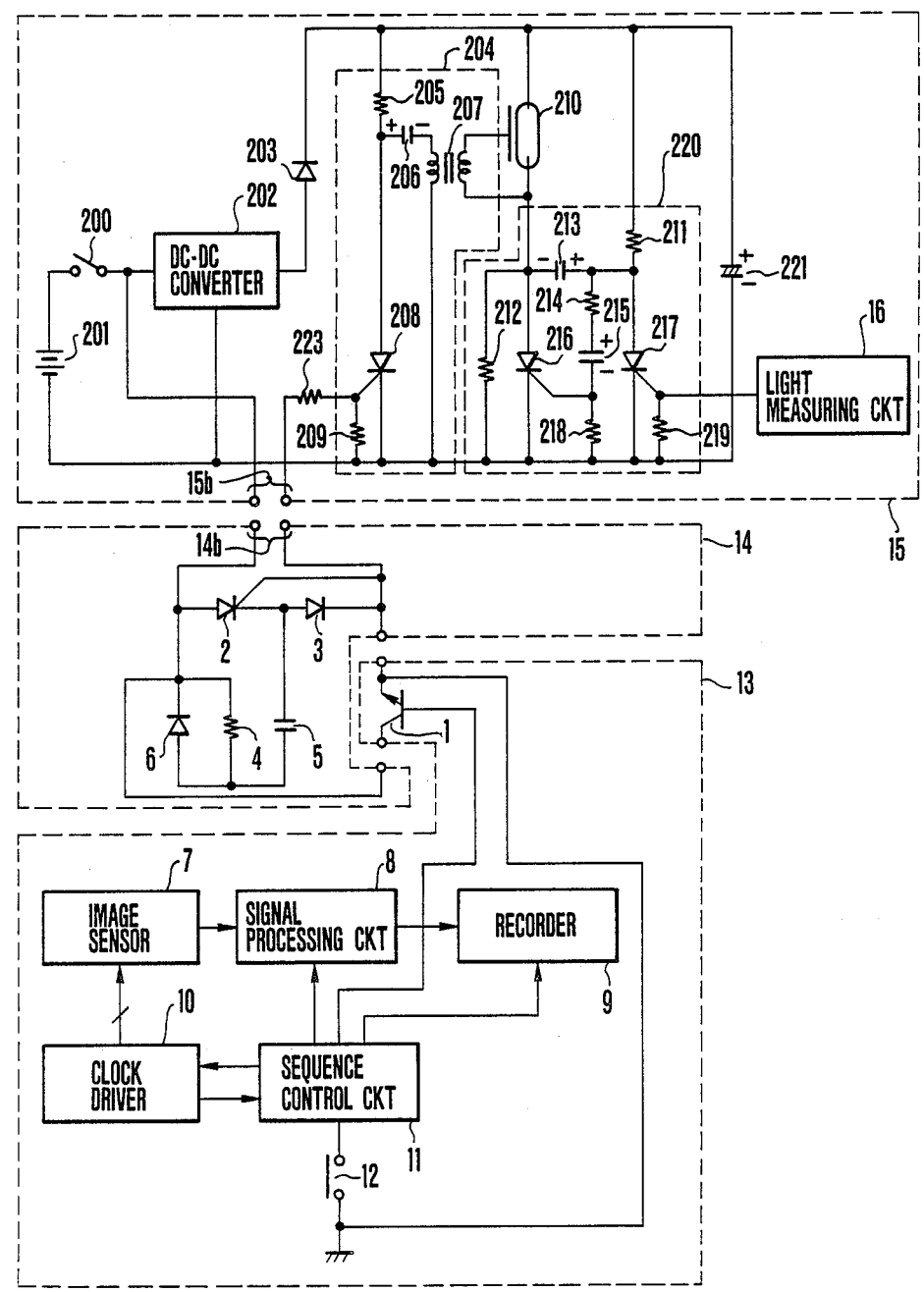
FIG. 5 is a circuit diagram showing the arrangement of a system wherein a flashing action starting arrangement embodying this invention as a third embodiment thereof is used for a flash device of the low voltage trigger type.

For the image sensing device 13 shown in FIG. 5, there is provided a transistor 1 which is arranged within the image sensing device 13 to have its collector and emitter serve as a contact for connection with a flash device. Therefore, if the flash device to be connected to this image sensing device 13 is of the low voltage trigger type, as in the case of a flash device 15 shown in FIG. 5, the image sensing device 13 is capable of causing the flash device 15 to flash even if the flash device 15 is connected directly to the image sensing device 13 without having the adaptor 14 in between them.

Figure 6:
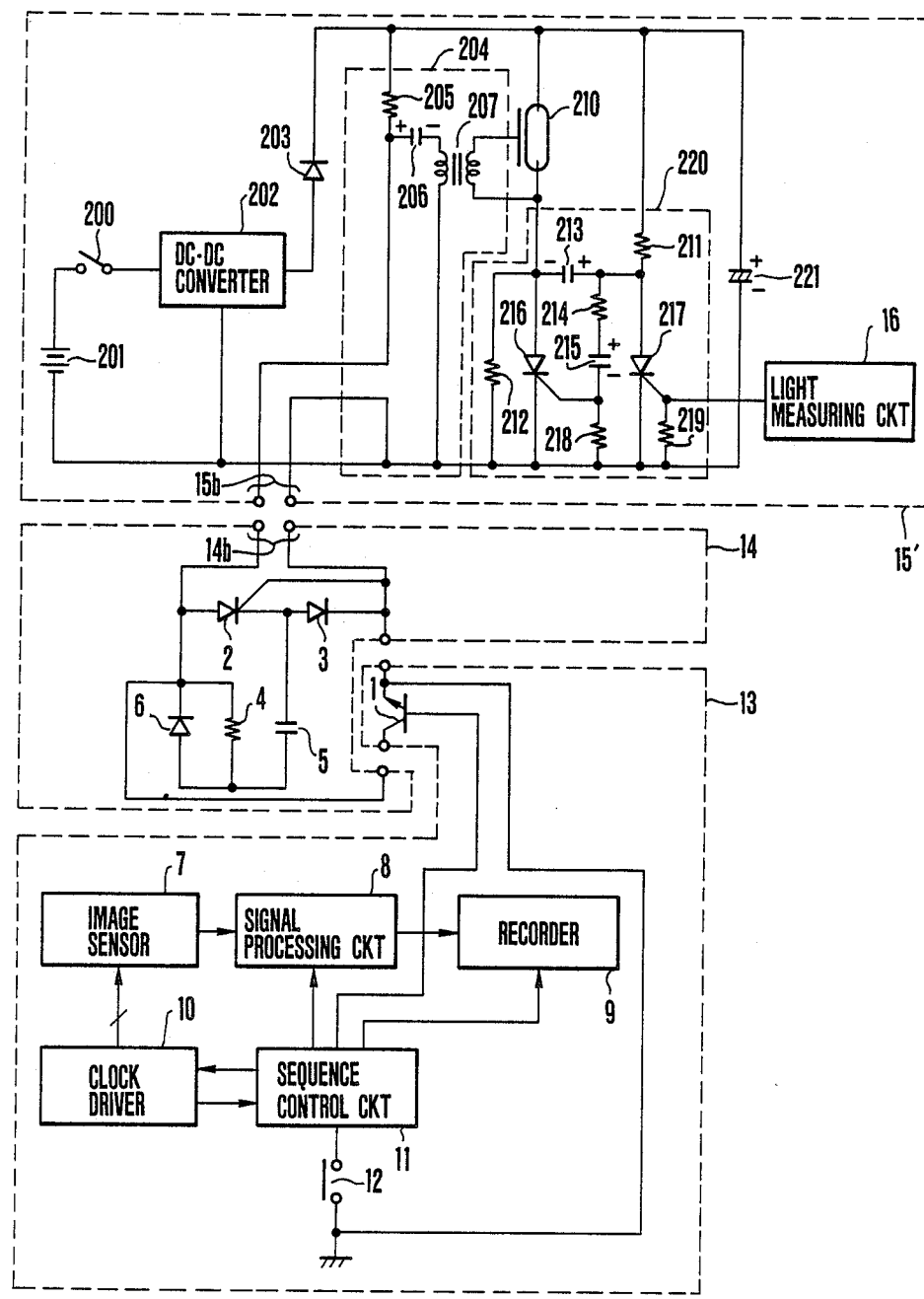
FIG. 6 is a circuit diagram showing the arrangement of a system wherein the third embodiment is used for a flash device of the high voltage trigger type.

Further, for a flash device 15′, which is of the high voltage trigger type and is arranged as shown in FIG. 6 is to be used in combination with the image sensing device 13, the flash device 15′ cannot be caused to flash by connecting it directly to the image sensing device without having the adaptor 14 in between them because of the substantially high ON resistance of the transistor 1, as previously mentioned. However, the use of the adaptor 14 enables the image sensing device to cause the flash device 15′ to flash by virtue of the thyristor as already described flashing action starting arrangements arranged according to this invention to use a photo-thyristor and to be capable of causing the flash devices of both the low and high voltage trigger types to flash are as described below with reference to FIGS. 7, 8 and 9.

Figure 7:
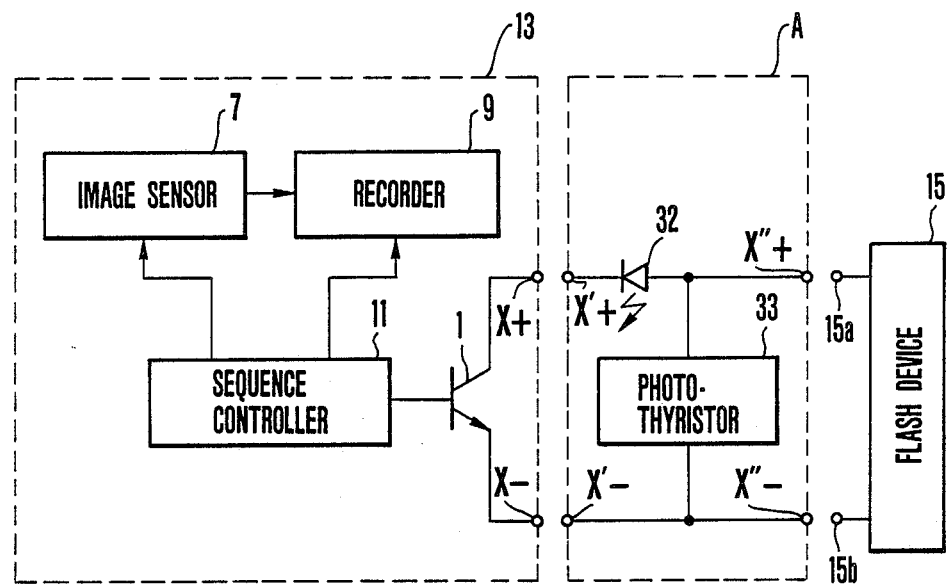
FIG. 7 is a circuit diagram showing a system employing a photo-thyristor.

FIG. 7 is a circuit diagram showing a further embodiment of this invention. The illustration includes a transistor 1; a light emitting element 32 such as an LED or the like; a photo-thyristor 33; a sequence controller 11 arranged to control an image sensor 7, a recorder 9, etc; and a flash device 15. The transistor 1 is included in an image sensing device 13. The light emitting element 32 and the photo-thyristor 33 are disposed within an adaptor A. The trigger terminals 15a and 15b of the flash device 15 are connected to terminals X+ and X− when the adaptor A is not mounted on the image sensing device 13 and to terminals X+" and X−" when the adaptor A is mounted.

In the event of no adaptor A, when a positive pulse is produced from the sequence controller 11 in response to a release operation, the transistor 1 turns on. A predetermined current is taken in from the terminals X+ and X− to cause the flash device 15 to flash if it is of the low voltage trigger type. If flash device 15 is of the high voltage trigger type, it is not caused to flash because of the high ON resistance of the transistor 1. In that case the flash device can be caused to flash only with the adaptor A mounted on the image sensor 13.

Figure 8:
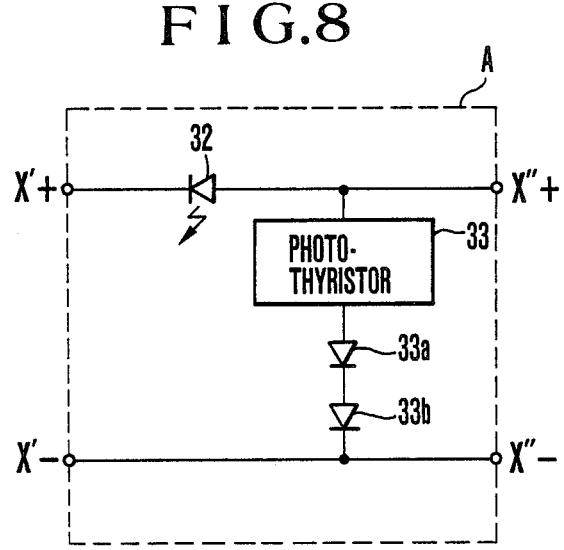
FIG. 8 shows the arrangement of an improvement over the system of FIG. 7.

With the adaptor A mounted, when the transistor 1 is turned on, a predetermined current is supplied to the light emitting element 32 to cause the element 32 to emit a light. The photo-thyristor 33 is turned on by this light. The terminals X+" and X−" are then interconnected at a very low impedance to instantaneously complete the supply of a large trigger current to enable the flash device of the high voltage trigger type to flash. After completion of the trigger discharge by means of the photothyristor 33, the current flowing to the photo-thyristor 33 is reduced to a value less than the holding current required by the photo-thyristor 33 by virtue of the transistor 1 and the light emitting element 32. Therefore, the photothyristor 33 can be turned off without fail. The current allowed to flow in that instance is small and the light of the light emitting element 32 is so weak that the photothyristor 33 is never turned on by that light. If the voltage generated when the current is allowed to flow to the transistor 1 and the light emitting element 32 after completion of the trigger discharge is higher than the ON voltage of the photo-thyristor 33, the high level can be shifted by connecting several diodes in series with the photothyristor 33. An example of this arrangement is as shown in FIG. 8. In FIG. 8, reference numerals 33a and 33b denote the diodes which are used for the level shifting purpose.

FIG. 9 shows a still further embodiment of this invention. Since this embodiment is similar to the preceding one shown in FIG. 7, the following description covers only the difference from the preceding embodiment. A light emitting element 32 is inserted in the image sensing devce 13 in parallel with the base and emitter of the transistor 1 via a switch 39 and a differentiation circuit 40. The adaptor A includes a photo-thyristor 33 which is optically coupled with the above-stated light emitting element 32. The switch 39 is arranged to turn on when the adaptor A is mounted on the image sensing device 13 and to turn off when the adaptor A is removed. The light emitting element 32 and the photo-thyristor 33 are optically coupled, for example, by means of a glass fiber member or the like.

In the operation of the embodiment of FIG. 9, when the adaptor A is not mounted, the transistor 1 alone turns on when the flash device is connected to the image sensing device. The flash device flashes if the flash device is of the low voltage trigger type but does not flash if it is of the high voltage trigger type.

With the adaptor A mounted, not only the transistor 1 turns on but also a power supply is momentarily effected via the differentiation circuit 40 to the light emitting element 32 from the switch 39, which is in an ON state. This causes the light emitting element 32 to flash. The light of the element 32 turns the photo-thyristor 33 on to permit a high voltage trigger type flash device to have a large current trigger discharge. In this instance, therefore, a flash device of the high voltage trigger type can be enabled to flash. A current after completion of the trigger discharge flows to the transistor 1. Then, a current flowing to the photothyristor 33 becomes smaller then a holding current required by the photo-thyristor 33. This without fail causes the photo-thyristor 33 to turn off.

Figure 10:
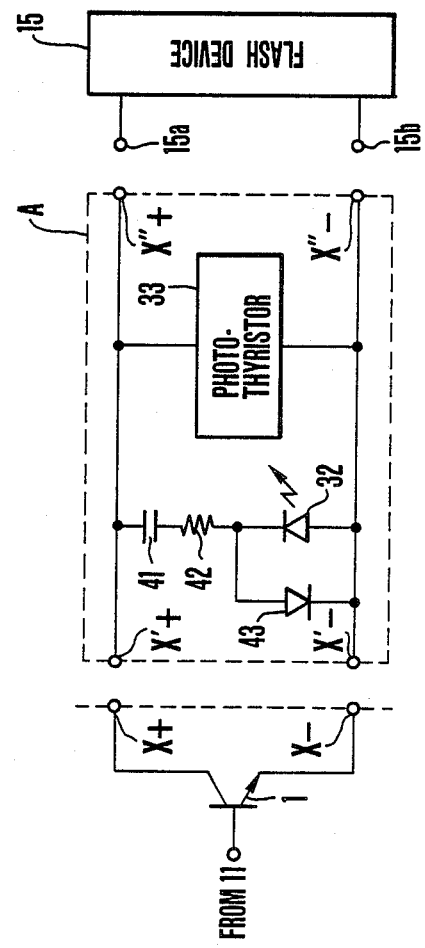
FIG. 10 is a circuit diagram showing the arrangement of a further example of a system employing a photothyristor.

FIG. 10 shows a still further embodiment of this invention. In this case, a series circuit composed of a light emitting element 32, a capacitor 41 and a resistor 42 is connected in parallel with a photo-thyristor 33 within the adaptor A. A diode 43 is connected in parallel with the light emitting element 32.

The operation of the FIG. 10 embodiment without the adaptor A is performed in the same manner as in the preceding embodiments. With the adaptor A mounted, the capacitor 41 is charged through the resistor 42 and the diode 42 as the flash device is charged. When the transistor 1 turns on in response to a release operation, a voltage between the terminals X+ and X− (or X+" and X−") drops to cause the electric charge of the capacitor 41 to be discharged through the resistor 42. A current resulting from this causes the light emitting element 32 to emit a light. The light turns the photo-thyristor 33 on. This permits flashing even if it is of the light voltage trigger type. After completion of the trigger discharge, the photo-thyristor 33 is caused to turn off in the same manner as in the case of preceding embodiment shown in FIGS. 7 and 8.

The diode 43 serves to protect the light emitting element 32, if the element is an LED, from having an inverse voltage applied thereto and to prevent the photo-thyristor 33 from being accidentally turned on with the light emitting element 32 caused to flash by the electric charge of the capacitor 41. The resistor 42 is arranged to prevent the trigger of the flash device from accidentally being operated by a charging current of the capacitor 41 when the flash device is mounted in a charged state.

In the embodiments described, the image sensing device uses an image sensor. However, in accordance with this invention, the image sensing device is of course not limited but may be a still picture camera using a silver halide film. As described, the flashing action starting arrangement enables an image sensing device to cause flash devices of both the high voltage trigger type and the low voltage trigger type to flash without fail despite the use of electronic circuit elements.

Further, the embodiments shown in FIGS. 7 to 10, each is arranged to start the flash device through an adaptor which includes a photo-thyristor. This arrangement enables the photo-thyristor to be reset without difficulty.

What is claimed is:

1. An adaptor to be interposed between an image sensing device and a flash device for synchronizing of said flash device with said image sensing device, comprising:
  (a) a first switch arranged to shift from a first state thereof to a second state in response to an image sensing device, said first switch being a transistor; and (b) a second switch for shifting from a first state to a second state in response to the shift of said first switch from the first state to the second state, said second switch being a thyristor and being arranged to cause said flash device to flash when said second switch shifts from the first state to the second state and to be brought back to the first state by said first switch when in the second state.

2. An adaptor according to claim 1, wherein said second switch allows a larger current flow than said first switch.

3. An adaptor according to claim 1, wherein said first and second switches are connected in parallel; and said first switch is arranged to have a smaller ON resistance when said first switch is in said second state then the ON resistance which said second switch has when the second switch is in said second state thereof.

4. An adaptor according to claim 1, wherein said first and second switches are connected in parallel; and said first switch is arranged to have a smaller ON resistance when said first switch is in said second state than the ON resistance which said second switch has when the second switch is in said second state thereof.

5. A flash action starting arrangement arranged to be attachable to and detachable from a flash device for synchronizing a flashing action of said flash device with an image sensing operation of an image sensing device, comprising:
(a) a first switch for shifting from a first state to a second state in response to the image sensing operation of said image sensing device, said first switch being a transistor; and
(b) a second switch for shifting from a first state to a second state in response to the shift of said first switch from the first state to the second state, said second switch being a thyristor and being arranged to cause said flash device to flash when said second switch shifts from the first state to the second state and to be brought back to the first state by said first switch when in the second state.

6. An arrangement according to claim 5, wherein said second switch allows a larger current flow than said first switch.

7. An arrangement according to claim 5, wherein said first and second switches are connected in parallel; and said first switch is arranged to have a smaller ON resistance when said first switch is in said second state than the ON resistance which said second switch has when the second switch is in its second state.

8. An arrangement according to claim 8, wherein said first and second switches are connected in parallel; and said first switch is arranged to have a smaller ON resistance when said first switch is in said second state than the ON resistance which said second switch has when the second switch is in its second state.

9. A flashing action starting arrangement arranged to be attachable to and detachable from a flash device for synchronizing a flashing action of said flash device with an image sensing operation of an image sensing device, comprising:
(a) first means for shifting from a first state to a second state in response to the image sensing operation of said image sensing device, said first means being light emitting means;
(b) second means for shifting from a first state to a second state in response to the shift of said first means from said first state to said second state thereof, said second means being arranged to cause said flash device to flash when said second switch is in the second state, and said second means having means for self-holding its second state; and
(c) returning means for returning said second means to its first state in response to a flashing action of said flash device when said second means is self-holding in said second state.

10. An arrangement according to claim 9, wherein said second means shifts from the first state thereof to the second in response to a light emitting action of said light emitting means.

11. An arrangement according to claim 9, wherein said returning means is arranged to negate said self-holding function.

12. An arrangement according to claim 9, wherein said light emitting means is a light emitting diode.

13. An arrangement according to claim 9, wherein said second means is a thyristor.

14. An arrangement according to claim 12, wherein said second means is a thyristor.

15. An arrangement according to claim 9, wherein said second means is arranged to receive a light emitted by said light emitting means and to cause said flash device to flash by shifting from the first state thereof to the second state in response to the light emitting action of said light emitting means.

16. An adaptor to be interposed between an image sensing device having two terminals electrically short-circuited during an image sensing operation thereof and a flash device for flashing when a predetermined current flows to said terminals while said two terminals are short-circuited, comprising:
(a) a thyristor having an anode thereof connected to one of said two terminals of said image sensing device and a gate thereof connected to the other of said two terminals, said anode being also connected to one terminal of said flash device and said gate being connected to another terminal of said flash device;
(b) a circuit arranged to connect a cathode of said thyristor to said anode, said circuit being a series circuit and including at least a resistor and a capacitor therein; and
(c) a current blocking element connected between a cathode and gate of said thyristor, said current blocking element being arranged to prevent an electric charge accumulated at said capacitor from flowing without passing between the cathode and the gate of said thyristor.

17. An adaptor according to claim 16, wherein said circuit including said capacitor includes a parallel circuit of said resistor and a diode, with said capacitor connected in series to said parllel circuit.

18. A flashing action starting arrangement capable of causing flash devices of both a high voltage trigger type and a low voltage trigger type to flash, comprising:
(a) a first trigger circuit for causing a flash device of the high voltage trigger type to flash, said first trigger circuit including a self-holding type switching element which is a thyristor;
(b) a second trigger circuit for causing a flash device of the low voltage trigger type to flash, said second trigger circuit including a transistor and being arranged in parallel with said first trigger circuit; and
(c) means for turning off said self-holding type switching element included in said first trigger circuit.

19. A flashing action starting arrangement arranged to be attachable to and detachable from a flash device for synchronizing a flashing action of said flash device with an image sensing operation of an image sensing device, comprising:
- (a) first means for shifting from a first state to a second state in response to the image sensing operation of said image sensing device, said first means being a transistor;
- (b) second means for shifting from a first state to a second state in response to the shift of said first means from said first state to said second state thereof, said second means being arranged to cause said flash device to flash when said second switch is in the second state, and said second means having means for self-holding its second state; and
- (c) returning means for returning said second means to its first state in response to a flashing action of said flash device when said second means is self-holding in said second state.

20. A flashing action starting arrangement capable of causing flash devices of both a high voltage trigger type and a low voltage trigger type to flash, comprising:
- (a) a first trigger circuit for causing a flash device of the high voltage trigger type to flash, said first trigger circuit including a self-holding type switching element which is a thyristor;
- (b) a second trigger circuit for causing a flash device of the low voltage trigger type to flash, said second trigger circuit being arranged in parallel with said first trigger circuit; and
- (c) means for turning off said self-holding type switching element included in said first trigger circuit.

* * * * *